United States Patent Office 3,152,189
Patented Oct. 6, 1964

3,152,189
STABILIZATION OF FORMALDEHYDE SOLUTIONS
Norman R. Kouba, Greenmeadow, Wilmington, Del., assignor to E. I. du Pont de Nemours and Company, Wilmington, Del., a corporation of Delaware
No Drawing. Filed Sept. 27, 1961, Ser. No. 141,024
6 Claims. (Cl. 260—606)

This invention relates to the stabilization of formaldehyde solutions and is more particularly directed to stabilizing low methanol aqueous formaldehyde solutions by the addition of small amounts of a betaine substituted with an alkyl group of 12 to 18 carbon atoms which have the following formula:

(1)
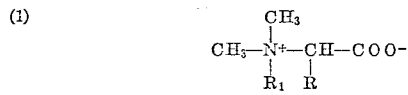

in which

R is hydrogen, an alkyl group of 12 to 18 carbon atoms, or an alkenyl group of 18 carbon atoms,
$R_1$ is an alkyl group of 12 to 18 carbon atoms, or an alkenyl group of 18 carbon atoms when R=hydrogen and is methyl when R=alkyl.

Low methanol aqueous formaldehyde solutions containing 30% or more formaldehyde by weight are apt to become cloudy during handling or storage. This is particularly true if the temperature is lowered below a critical level which depends upon the concentration of the formaldehyde. Apparently polymerization of formaldehyde takes place and insoluble formaldehyde polymers precipitate upon prolonged standing or if the temperature is lowered below a critical level.

To minimize such cloudiness and precipitation, it has heretofore been suggested that methanol be added in comparatively large amounts. Thus, U.S.P. formaldehyde is a 37% formaldehyde solution which contains 7 to 15% methanol. From the chemical standpoint such methanol additions are not technically objectionable for some uses but are for others. The levels of methanol required for stabilization adds to the cost of formaldehyde solutions.

According to the present invention a small amount of one or more betaine compounds of the Formula 1 given above is added to an aqueous solution of formaldehyde to retard the formation of turbidity and precipitates. The formaldehyde solutions to be stabilized according to the invention are those normally sold in commerce and they may contain from 30% up to 60% or even more formaldehyde. Sometimes such commercial solutions are deionized. As noted above, the solutions can contain a small amount of methanol. It is preferred according to the present invention to use low methanol solutions of formaldehyde in which the methanol amounts to no more than about 2% by weight of formaldehyde solution.

The betaines to be used according to the invention are those shown in Formula 1 above. In the formula, R and $R_1$ can be a saturated alkyl group of 12 to 18 carbon atoms. These can include such groups as lauryl, hexadecyl, and stearyl. The groups will ordinarily be derived from a natural source and the stearyl group, for example, will be derived from tallow. The alkyl group of 18 carbon atoms can be unsaturated and can also be derived from a natural source, for example, the octadecyl group will be derived from soya.

The preferred betaines of the example are C-cetyl betaine:

(2)
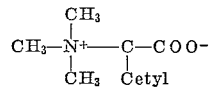

and N-stearyl betaine:

(3)
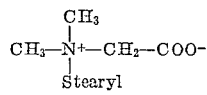

The amount of a betaine compound which can be used for stabilization can vary widely. Generally from about 30 to about 10,000 parts per million of the betaine compound will be used based upon 100% formaldehyde. Below 30 parts per million the magnitude of the stabilizing effect diminishes but such smaller amounts can be used to obtain the desired effect. The addition of the betaine compound in quantities in excess of 10,000 parts per million is wasteful and undesirable. The optimum amount should be as small as is required to produce the desired stabilization effect.

While the broad ranges indicated are permissible it will ordinarily be found desirable to use from about 50 to no more than 1000 parts per million or less based on the weight of 100% formaldehyde.

It is noted that some materials which are chemically similar to the betaine compounds are used successfully as polymerization catalysts for formaldehyde when used in larger amounts and under proper conditions. It is surprising that the betaine compound will also serve as a stabilizer against polymerization.

Stabilized formaldehyde compositions of the invention preferably have a pre-selected high pH and also contain an anti-foam agent.

The prior practice has been to sell formaldehyde solutions at pH's over a considerable range. For example, compositions of low methanol content will often have a pH as low as around 3 while some formaldehyde solutions are sold commercially with a pH as high as about 5.5 or so. For purposes of the present invention it is desirable to use a relatively high pH consistent with good product quality considering the amount of methanol and of formaldehyde concentration.

Generally, it can be said that the betaines of the present invention should be used in formaldehyde solutions having a pH of about 2.5 to 6, while more specifically it is preferred that the pH range from between about 3.5 to 4.5. Still more specifically, all factors permitting, it is most desired that the pH be around 3.8.

Formaldehyde solutions stabilized with betaines according to the invention have some tendency to foam. This becomes greater as larger amounts are used. It is accordingly often desirable to include an anti-foam agent in compositions of the invention. There can be used any of the numerous anti-foam agents known to the art which are compatible in the system. The technique of using anti-foam agents is of course very well understood.

There can be used for example a silicone antifoam agent. Thus there can be employed a silicone emulsion in the amount of about 15 to 30 parts per million by weight based upon the total solution. Of course more can be used. One such suitable silicone emulsion is that made from a silicone resin and called "Anti-Foam 60" sold by General Electric. The composition of "Anti-Foam 60" is described in Supplement II to the 1953 edition of Handbook of Material Trade Names by O. T. Zimmerman and Irvin Lavine, published by Industrial Research Service, Inc.

Similarly other agents can be used such as sulfated oleic acid. Somewhat more of the sulfated oleic acid is required and the amount can be of the order of 100 parts per million of formaldehyde solution. Tridecyl phosphate can likewise be used at 100 parts per million. Tertiary dodecyl monoglycol thioether can similarly be used in like amounts.

The invention can be better understood by reference to the following examples:

*Example 1*

A commercial aqueous solution of formaldehyde containing 37% by weight of formaldehyde and 1% methanol was stabilized according to the invention by adding thereto a 25% aqueous solution of C-cetyl betaine. The optimum concentration of the stabilizer was 200 to 400 parts per million of the C-cetyl betaine solution by weight based on the weight of the 37% solution. This is approximately 200 parts per million of the betaine compound based on the weight of 100% formaldehyde.

The solution as thus prepared was quite stable. When samples of this solution were stored in a cool place at 60° F. for 30 days only a small amount of polymer formed and readily redissolved when the solution was heated at about 110° F. A similar commercial formaldehyde solution not containing the betaine compound when stored under similar conditions forms a voluminous precipitate which occupies about one-half of the container. This precipitate is much more difficult to redissolve than that obtained in such solutions stabilized according to the invention.

Instead of using about 200 parts per million of C-cetyl betaine as shown above, a lesser degree of stabilization can be achieved with the addition of as little as about 30 parts. If substantially greater rates than 200 parts per million are used, the solution will be stabilized against the formation of solid polymer, but the supernatant liquid may become turbid on storage at 60° F.

A formaldehyde solution containing about 39% formaldehyde can be similarly treated using the same amounts of C-cetyl betaine and will be stabilized against the formation of polymer for 10 days when stored at 60° F. A degree of stabilization is also noted when the appropriate amount of C-cetyl betaine is added to 55% aqueous formaldehyde solution and the material is stored at about 125° F.

An anti-foam agent can additionally be included in each of the compositions above and below described and there can be used, for example, 15 to 30 parts per million by weight based upon the weight of solution of a silicone emulsion anti-foam agent.

Following the practices of Example 1, 37% and 55% formaldehyde solutions can be stabilized by addition of each of the following betaine compounds. The rates used with respect to each compound in each formaldehyde solution is 25 parts per million, 125 parts per million and 250 parts per million.

*Example 2*

N-lauryl betaine.

*Example 3*

N-hexadecyl betaine.

*Example 4*

N-octadecyl betaine (from soya).

*Example 5*

N-stearyl betaine.

*Example 6*

C-stearyl betaine.

*Example 7*

C-octadecyl betaine (from soya).

*Example 8*

C-lauryl betaine.

The claims are:

1. An aqueous solution of formaldehyde of at least 30% up through about 60% concentration stabilized by the inclusion of from 30 to 10,000 parts per million based upon the weight of $CH_2O$ in the formaldehyde solution of a betaine of the formula:

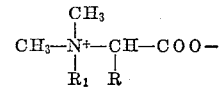

in which

R is selected from the group consisting of hydrogen, an alkyl group of 12 to 18 carbon atoms and an alkenyl group of 18 carbon atoms, $R_1$ is selected from the group consisting of an alkyl group of 12 to 18 carbon atoms, and an alkenyl group of 18 carbon atoms when R=hydrogen and methyl when R=alkyl.

2. An aqueous solution of formaldehyde of at least 30% up through about 60% concentration stabilized by the inclusion of from 30 to 10,000 parts per million based upon the weight of $CH_2O$ in the formaldehyde solution of N-stearyl betaine.

3. An aqueous solution of formaldehyde of at least 30% up through about 60% concentration stabilized by the inclusion of from 30 to 10,000 parts per million based upon the weight of $CH_2O$ in the formaldehyde solution of C-cetyl betaine.

4. An aqueous solution of formaldehyde of at least 30% up through about 60% concentration stabilized by the inclusion of from 30 to 10,000 parts per million based upon the weight of $CH_2O$ in the formaldehyde solution of N-cetyl betaine.

5. An aqueous solution of formaldehyde of at least 30% up through about 60% concentration stabilized by the inclusion of from 30 to 10,000 parts per million based upon the weight of $CH_2O$ in the formaldehyde solution of N-lauryl betaine.

6. An aqueous solution of formaldehyde of at least 30% up through about 60% concentration stabilized by the inclusion of from 30 to 10,000 parts per million based upon the weight of $CH_2O$ in the formaldehyde solution of N-oleic betaine.

References Cited in the file of this patent

UNITED STATES PATENTS 2,000,152   Walker _____ May 7, 1935